W. H. MAPLE.
Seed-Planter.
No. 38,313.
Patented Apr. 28. 1863.
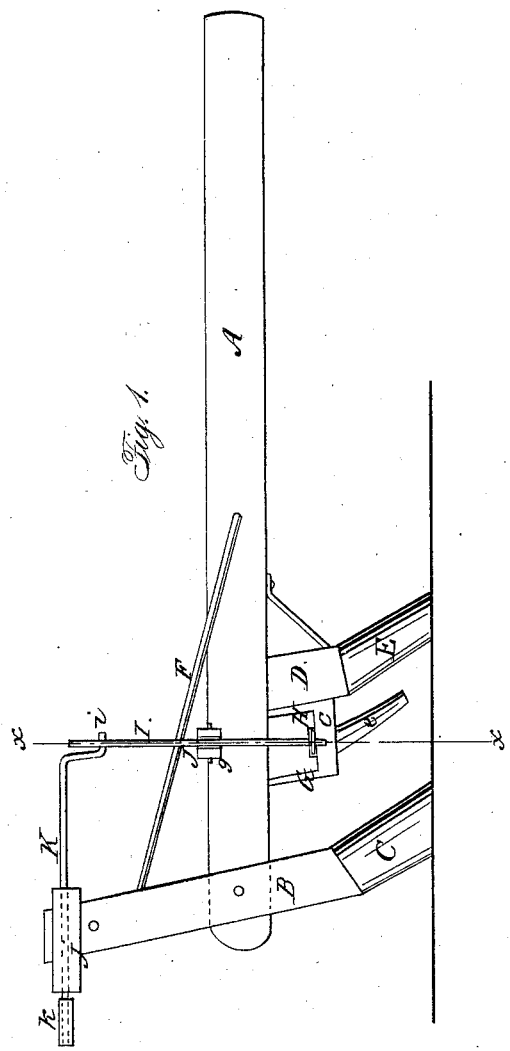
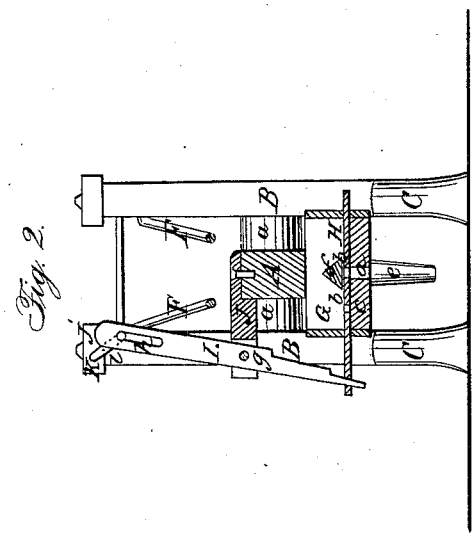
Witnesses:
J W Coombs
G W Reed
Inventor:
W H Maple
per Munn & Co
Attys

UNITED STATES PATENT OFFICE.

WM. H. MAPLE, OF CHARITON, IOWA.

IMPROVEMENT IN CORN-PLANTERS.

Specification forming part of Letters Patent No. 38,313, dated April 28, 1863.

*To all whom it may concern:*

Be it known that I, W. H. MAPLE, of Chariton, in the county of Lucas and State of Iowa, have invented a new and Improved Corn-Planter; and I do hereby declare that the following is a full, clear, and exact description of the same, reference being had to the accompanying drawings, making a part of this specification, in which—

Figure 1 is a side view of my invention; Fig. 2, a transverse vertical section of the same, taken in the line $x\,x$, Fig. 1.

Similar letters of reference indicate corresponding parts in the two figures.

This invention consists in a novel seed-distributing device arranged in such a manner that it may be readily operated by hand in guiding the machine, and having said seed-distributing device applied to a frame provided with three shares, all being arranged in such a manner that the implement will form the furrow, drop the seed, and cover the same, and be capable, when desired, of being used as a cultivator without any change in the position of the parts.

To enable those skilled in the art to fully understand and construct my invention, I will proceed to describe it.

A represents a beam, having two standards, B B, attached to its back part, one at each side. These standards are not attached directly to the beam, but to horizontal projections $a\,a$, secured thereto, said projections being for the purpose of admitting of a requisite space between the two standards. (See Fig. 2.)

To the lower end of each standard B there is attached a share, C. These shares may be of the shovel-form; or any other suitable kind may be used.

To the beam A, and at a short distance in front of the standards B B, there is attached a standard, D, which projects downward from the under side of the beam A, and has a share, E, attached to it similar to the shares C. The standards B B extend upward a considerable distance above the beam A, and they are held firmly in position by two braces, F F, the front ends of which are attached to beams A, one to each side of it.

To the under side of the beam A, just back of the standard D, there is secured a seed-box, G, which is of rectangular form, and has a slide, H, fitted in it, said slide being perforated with two holes, $b\,b$, at a suitable distance apart. The bottom $c$ of the seed-box has a hole, $d$, made centrally in it, and a tube or discharge-spout, $e$, is attached to the under side of the seed-box in line with the hole $d$. (See Fig. 2.)

In the seed-box, at its center, there is secured transversely a bar, $f$, which serves as a cut-off, and prevents the seed from passing out of the hopper, except that which is drawn underneath the bar in the holes $b\,b$ of the slide H.

One end of the slide H is connected to the lower end of a lever, I, which has its fulcrum-pin $g$ passing through a bar, J, the latter being attached to the beam A and projecting from it at right angles. The upper end of the lever I has an oblong slot, $h$, made longitudinally in it, through which the end of a crank, $i$, passes, said crank being at the front end of a shaft, K, which has its bearing $j$ attached to the upper end of one of the standards B. The back or outer end of the shaft, K, has a handle, $k$, fitted on it. The discharge tube or spout $e$ is in line with and directly behind the front share, E, the shares C being one at each side of the tube or spout $e$, but some distance behind it.

From the above description it will be seen that as the device is drawn along the person guiding or holding the back part of the device can readily turn the handle $k$ and shaft K, and thereby operate the crank $i$ first in one direction and then in the other, and the crank, through the medium of the lever I, will impart a reciprocating motion to the slide H, so that the seed will be discharged through the tube or spout $e$ by the holes $b\,b$ in the slide H. The seed is dropped in the furrow made by the share E, and the seed is covered by the shares C C. The seed, it will be seen, is dropped at the will of the operator and with the greatest facility, and the device may be used as a cultivator at any time without detaching the seed-dropping apparatus.

I would remark that a roller may, if desired, be attached to the implement to press the earth down upon the seed.

Having thus described my invention, what I claim as new, and desire to secure by Letters Patent, is—

The shaft K, provided with a crank, $i$, and the lever I connected with the crank $i$, as shown, for operating the seed-slide H when said parts are applied to or used in combination with a beam, A, having three shares, E C C, attached to it, and all arranged as set forth.

WM. H. MAPLE.

Witnesses:
LEONARD N. JUDD,
JOHN L. MCBRIDE.